(12) United States Patent
Kerr et al.

(10) Patent No.: US 12,555,281 B2
(45) Date of Patent: Feb. 17, 2026

(54) MANAGING MULTIPLE DATASETS FOR DATA BOUND OBJECTS

(71) Applicant: Adobe Inc., San Jose, CA (US)

(72) Inventors: Bernard Kerr, Sausalito, CA (US); Dmytro Baranovskiy, Sydney (AU); Benjamin Farrell, Hayward, CA (US)

(73) Assignee: Adobe Inc., San Jose, CA (US)

( * ) Notice: Subject to any disclaimer, the term of this patent is extended or adjusted under 35 U.S.C. 154(b) by 327 days.

(21) Appl. No.: 17/980,479

(22) Filed: Nov. 3, 2022

(65) Prior Publication Data
US 2024/0153170 A1 May 9, 2024

(51) Int. Cl.
G06T 11/20 (2006.01)
G06T 3/40 (2024.01)

(52) U.S. Cl.
CPC .............. *G06T 11/206* (2013.01); *G06T 3/40* (2013.01)

(58) Field of Classification Search
CPC .............................. G06T 11/206; G06T 3/40
See application file for complete search history.

(56) References Cited

U.S. PATENT DOCUMENTS

| | | | |
|---|---|---|---|
| 5,226,118 A | 7/1993 | Baker et al. |
| 5,359,724 A | 10/1994 | Earle |
| 5,437,008 A | 7/1995 | Gay et al. |
| 5,461,708 A | 10/1995 | Kahn |
| 5,581,678 A | 12/1996 | Kahn |
| 5,608,899 A | 3/1997 | Li et al. |
| 5,619,631 A | 4/1997 | Schott |
| 5,990,888 A | 11/1999 | Blades et al. |
| 5,999,192 A | 12/1999 | Selfridge et al. |
| 6,222,540 B1 | 4/2001 | Sacerdoti |
| 6,995,768 B2 | 2/2006 | Jou et al. |
| 7,158,123 B2 | 1/2007 | Myers et al. |
| 7,574,652 B2 | 8/2009 | Lennon et al. |
| 7,644,361 B2 | 1/2010 | Wu et al. |
| 7,788,606 B2 | 8/2010 | Patel et al. |
| 8,527,909 B1 | 9/2013 | Mullany |

(Continued)

OTHER PUBLICATIONS

Chroma.js Color Palette Helper, available online at <https://web.archive.org/web/20210420231939/https://vis4.net/palettes/#/9ls|00429d,96ffea,ffffe0|ffffe0, ff005e,93003a|1|1>, Apr. 20, 2021, 1 page.

(Continued)

*Primary Examiner* — Devona E Faulk
*Assistant Examiner* — Donna J. Ricks
(74) *Attorney, Agent, or Firm* — Nicholson De Vos Webster & Elliott LLP

(57) ABSTRACT

Embodiments are disclosed for managing multiple data visualizations on a digital canvas. In some embodiments, a method of managing multiple data visualizations includes generating a first graphic object on a digital canvas. A first dataset is received and used to generate a first chart based on the first dataset and a visual property of the first graphic object. The first chart comprises a first plurality of graphic objects including the first graphic object. A second dataset is then received and used to generate a second chart on the digital canvas based on the second dataset. The second chart includes a second plurality of graphic objects. An axis of the first chart and an axis of the second chart are merged such that the axis the first chart and the axis of the second chart share a scale attribute.

15 Claims, 12 Drawing Sheets

(56) References Cited

U.S. PATENT DOCUMENTS

| | | |
|---|---|---|
| 8,581,840 B2 | 11/2013 | Mudu et al. |
| 8,661,358 B2 | 2/2014 | Duncker et al. |
| 8,743,122 B2 | 6/2014 | Riche et al. |
| 8,860,762 B2 | 10/2014 | Koshi et al. |
| 9,058,365 B2 | 6/2015 | Baumgaertel et al. |
| 9,134,901 B2 | 9/2015 | Cragun |
| 9,135,233 B2 | 9/2015 | Fan et al. |
| 9,158,766 B2 | 10/2015 | Blyumen |
| 9,202,297 B1 | 12/2015 | Winters et al. |
| 9,251,548 B1 | 2/2016 | Garrity et al. |
| 9,323,445 B2 | 4/2016 | Kritt et al. |
| 9,377,864 B2 | 6/2016 | Tullis et al. |
| 9,389,777 B2 | 7/2016 | Sekharan |
| 9,513,792 B2 | 12/2016 | Koshi et al. |
| 9,558,172 B2 | 1/2017 | Rampson et al. |
| 9,563,674 B2 | 2/2017 | Hou et al. |
| 9,569,082 B1 | 2/2017 | Jin et al. |
| 9,690,449 B2 | 6/2017 | Morozov et al. |
| 9,760,262 B2 | 9/2017 | Drucker et al. |
| 9,761,026 B1 | 9/2017 | Barabas et al. |
| 9,792,017 B1 | 10/2017 | Landefeld et al. |
| 9,804,726 B1 | 10/2017 | Joos et al. |
| 9,817,563 B1* | 11/2017 | Stokes .................... G06F 40/18 |
| 9,824,470 B2 | 11/2017 | Kuo |
| 9,892,531 B2 | 2/2018 | Csenteri et al. |
| 10,049,141 B2 | 8/2018 | Prophete et al. |
| 10,109,086 B1 | 10/2018 | Bakshi et al. |
| 10,146,846 B2 | 12/2018 | Genochio et al. |
| 10,275,305 B2 | 4/2019 | Venkateswarulu et al. |
| 10,282,360 B2 | 5/2019 | Krause et al. |
| 10,416,871 B2 | 9/2019 | Hou et al. |
| 10,423,313 B2 | 9/2019 | Olsson et al. |
| 10,521,077 B1 | 12/2019 | Beran |
| 10,685,035 B2 | 6/2020 | Keahey et al. |
| 10,698,599 B2 | 6/2020 | D'Angelo et al. |
| 10,732,810 B1 | 8/2020 | Cohen et al. |
| 10,809,881 B2 | 10/2020 | Kindelsberger et al. |
| 10,877,984 B1 | 12/2020 | Martino et al. |
| 11,023,110 B2 | 6/2021 | Kerr |
| 11,042,558 B1 | 6/2021 | Hearst et al. |
| 11,270,483 B1 | 3/2022 | Chilamakuri et al. |
| 11,340,750 B1 | 5/2022 | Willis et al. |
| 11,625,149 B2 | 4/2023 | Leyden et al. |
| 12,056,445 B2 | 8/2024 | Dvorak |
| 2002/0059258 A1 | 5/2002 | Kirkpatrick |
| 2002/0118192 A1 | 8/2002 | Couckuyt et al. |
| 2004/0030504 A1 | 2/2004 | Helt et al. |
| 2004/0085316 A1 | 5/2004 | Malik |
| 2005/0068320 A1 | 3/2005 | Jaeger |
| 2005/0108643 A1 | 5/2005 | Schybergson et al. |
| 2005/0232055 A1 | 10/2005 | Couckuyt et al. |
| 2006/0103651 A1 | 5/2006 | Kessler et al. |
| 2007/0060798 A1 | 3/2007 | Krupnik et al. |
| 2007/0126736 A1 | 6/2007 | Tolle et al. |
| 2008/0195643 A1 | 8/2008 | Sheth-Voss et al. |
| 2009/0096812 A1 | 4/2009 | Boixel et al. |
| 2009/0322755 A1 | 12/2009 | Holm-Peterson et al. |
| 2010/0005411 A1 | 1/2010 | Duncker et al. |
| 2010/0308102 A1 | 12/2010 | Mochizuki |
| 2011/0115814 A1 | 5/2011 | Heimendinger et al. |
| 2011/0283231 A1 | 11/2011 | Richstein et al. |
| 2011/0307509 A1 | 12/2011 | Hsiao et al. |
| 2012/0089902 A1 | 4/2012 | Sheflin |
| 2012/0166470 A1 | 6/2012 | Baumgaertel et al. |
| 2012/0254783 A1 | 10/2012 | Pourshahid et al. |
| 2013/0009963 A1 | 1/2013 | Albrecht |
| 2013/0080444 A1 | 3/2013 | Wakefield et al. |
| 2013/0086107 A1 | 4/2013 | Genochio et al. |
| 2013/0097177 A1 | 4/2013 | Fan et al. |
| 2013/0145244 A1 | 6/2013 | Rothschiller et al. |
| 2013/0187926 A1 | 7/2013 | Silverstein et al. |
| 2013/0229416 A1 | 9/2013 | Krajec et al. |
| 2013/0232174 A1 | 9/2013 | Krajec et al. |
| 2013/0249917 A1 | 9/2013 | Fanning et al. |
| 2013/0275904 A1 | 10/2013 | Bhaskaran et al. |
| 2014/0053091 A1 | 2/2014 | Hou et al. |
| 2014/0149947 A1 | 5/2014 | Blyumen |
| 2014/0267290 A1 | 9/2014 | Hao et al. |
| 2014/0282184 A1 | 9/2014 | Dewan et al. |
| 2014/0282276 A1 | 9/2014 | Drucker et al. |
| 2014/0300603 A1 | 10/2014 | Greenfield |
| 2015/0015504 A1 | 1/2015 | Lee et al. |
| 2015/0040047 A1 | 2/2015 | Baarz et al. |
| 2015/0294275 A1 | 10/2015 | Richardson et al. |
| 2015/0317807 A1 | 11/2015 | Bartley et al. |
| 2015/0339032 A1 | 11/2015 | Bandera et al. |
| 2015/0355835 A1 | 12/2015 | Tsukahara et al. |
| 2016/0026695 A1 | 1/2016 | Fan et al. |
| 2016/0027193 A1 | 1/2016 | Schiffer et al. |
| 2016/0055232 A1 | 2/2016 | Yang et al. |
| 2016/0055659 A1 | 2/2016 | Wilson et al. |
| 2016/0062555 A1 | 3/2016 | Ward et al. |
| 2016/0103872 A1 | 4/2016 | Prophete et al. |
| 2016/0291845 A1 | 10/2016 | Lingappa |
| 2016/0307344 A1 | 10/2016 | Monnier et al. |
| 2016/0314606 A1 | 10/2016 | Tolle et al. |
| 2016/0350951 A1 | 12/2016 | Chan et al. |
| 2017/0004638 A1* | 1/2017 | Csenteri ................ G06T 11/206 |
| 2017/0039741 A1 | 2/2017 | Bhatnagar et al. |
| 2017/0053425 A1 | 2/2017 | Lee |
| 2017/0205998 A1 | 7/2017 | Jin et al. |
| 2017/0228898 A1 | 8/2017 | Liu et al. |
| 2017/0236312 A1 | 8/2017 | Ruble et al. |
| 2017/0300545 A1 | 10/2017 | Lee et al. |
| 2017/0344236 A1 | 11/2017 | Drucker et al. |
| 2018/0025073 A1 | 1/2018 | Singh et al. |
| 2018/0089237 A1 | 3/2018 | Dunne et al. |
| 2018/0129513 A1 | 5/2018 | Gloystein et al. |
| 2018/0137667 A1 | 5/2018 | Kindelsberger et al. |
| 2018/0165844 A1* | 6/2018 | Kirichenko .......... G06T 11/206 |
| 2018/0165851 A1 | 6/2018 | Apte et al. |
| 2018/0174337 A1 | 6/2018 | Menard et al. |
| 2018/0294046 A1 | 10/2018 | Kamura et al. |
| 2018/0306839 A1 | 10/2018 | Donnal et al. |
| 2018/0341392 A1 | 11/2018 | Zheng et al. |
| 2018/0349516 A1 | 12/2018 | Dutta et al. |
| 2018/0365303 A1 | 12/2018 | Prophete et al. |
| 2019/0043228 A1 | 2/2019 | Bhat et al. |
| 2019/0065036 A1 | 2/2019 | Drucker et al. |
| 2019/0114054 A1 | 4/2019 | Kerr |
| 2019/0114055 A1* | 4/2019 | Kerr ..................... G06T 11/206 |
| 2019/0114057 A1 | 4/2019 | Kerr |
| 2019/0114308 A1 | 4/2019 | Hancock |
| 2019/0114817 A1 | 4/2019 | Kerr |
| 2019/0311812 A1 | 10/2019 | Sweeney |
| 2019/0324072 A1 | 10/2019 | Underwood |
| 2020/0004412 A1 | 1/2020 | Ahuja et al. |
| 2020/0005509 A1 | 1/2020 | Gibb et al. |
| 2020/0110394 A1 | 4/2020 | Hirata |
| 2020/0393940 A1 | 12/2020 | Stewart |
| 2021/0081663 A1 | 3/2021 | Pandit et al. |
| 2021/0256019 A1 | 8/2021 | Prophete et al. |
| 2022/0004293 A1 | 1/2022 | Stewart |
| 2022/0027555 A1 | 1/2022 | Dvorak |
| 2022/0202320 A1 | 6/2022 | Diener et al. |
| 2022/0300882 A1 | 9/2022 | Malik |
| 2022/0405993 A1 | 12/2022 | Li et al. |
| 2023/0077829 A1 | 3/2023 | Lee et al. |
| 2023/0230300 A1 | 7/2023 | Yagi et al. |
| 2023/0305679 A1 | 9/2023 | Marco et al. |
| 2024/0153170 A1 | 5/2024 | Kerr et al. |
| 2024/0153171 A1 | 5/2024 | Kerr et al. |
| 2024/0169615 A1 | 5/2024 | Chen et al. |
| 2024/0265595 A1 | 8/2024 | Zhao et al. |

OTHER PUBLICATIONS

Github, "chroma.js", available online at <https://web.archive.org/web/20210322202649/https://gka.github.io/chroma.js/>, Mar. 22, 2021, 24 pages.

Kennedy Design, Inc., "Divergent Color Scale", available online at <https://www.learnui.design/tools/data-color-picker.html#divergent>, 2023, 3 pages.

(56) References Cited

OTHER PUBLICATIONS

Non-Final Office Action, U.S. Appl. No. 17/980,485, Jul. 22, 2024, 25 pages.
Non-Final Office Action, U.S. Appl. No. 17/980,481, Apr. 12, 2024, 33 pages.
Final Office Action, U.S. Appl. No. 17/980,481, Nov. 26, 2024, 93 pages.

* cited by examiner

MANAGING MULTIPLE DATASETS FOR DATA BOUND OBJECTS

BACKGROUND

Data visualizations, such as charts, graphs, and other visualizations, provide a schematic representation of data that communicates information about the underlying data visually. Creating a data visualization may be a complex and iterative process as it often involves alternating between data manipulation and visual design aspects of the visualization being crafted. Traditional methods of creating data visualizations include using a visualization template, manually drawing the visualization, or writing computer code to build a unique data visualization.

SUMMARY

Introduced here are techniques/technologies for managing multiple data visualizations on the same digital canvas. A data visualization is created by binding data to a visual property of a graphic object on the digital canvas. Data is treated as another design element, like color, shapes, etc. This means that a designer can add datasets to the digital canvas and use them as part of their drawing by binding a variable from the dataset to a visual property of a graphic object. This binding establishes a relationship between the data in the dataset and the visual property of the graphic object. Additionally, multiple graphic objects can be created automatically corresponding, e.g., to each row of the variable. This automatically creates a data visualization of the data. The designer can add multiple datasets to the canvas and bind different graphic objects to different datasets. This results in multiple data visualizations on the same canvas, bound to different datasets.

Once the data visualizations have been created, they can be managed together. This may include synchronizing properties across the data visualizations. For example, when a new data visualization is created, a number of data visualization properties are set. These can include a scale, which defines how the value of an observation in the dataset relates to a value of the bound visual property of the graphic object, and a zero point, which corresponds to an origin point of a coordinate system created for the data visualization. By synchronizing these properties, the designer can ensure that data that represents the same phenomena are depicted visually consistently. Additionally, by synchronizing zero points across data visualizations, the data visualizations can be combined in ways that allow for the data to be compared from a shared starting point.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
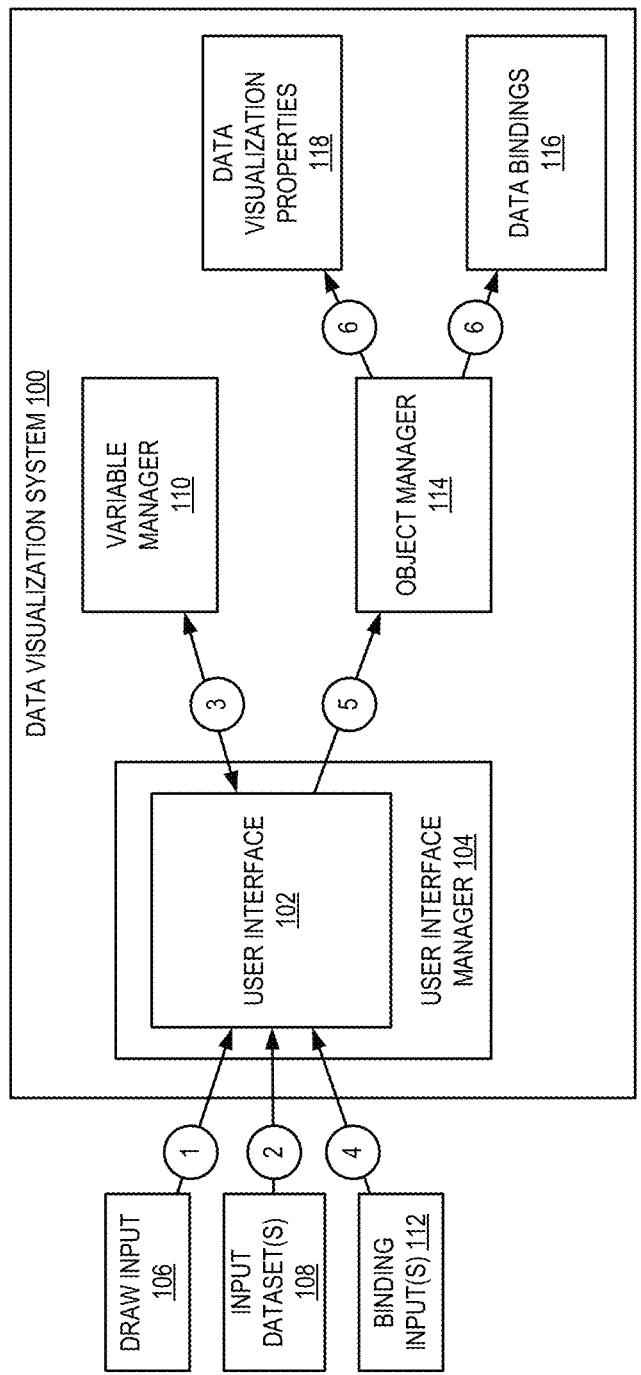
FIG. 1 illustrates a diagram of a process of generating data visualizations based on multiple datasets in accordance with one or more embodiments.

One or more embodiments of the present disclosure are directed to managing data visualizations bound to different datasets. Data visualizations (e.g., charts, infographics, etc.) are a tool for communicating information about a dataset to viewers. Through data visualizations, information can be clearly and creatively presented. Previously, data visualization techniques were manually implemented. For example, charts and graphs that include various graphic objects were manually drawn to match a dataset. Although this provides maximum creativity, as the data visualization is drawn from scratch by the designer, it is slow and not readily applicable to new charts or datasets. For example, if changes to the underlying dataset were made, or if a new visualization were desired, the previous data visualizations had to be thrown out and new ones created. Alternatively, custom code was written to generate data visualizations from a dataset. Although such code could potentially create new data visualizations from different datasets, it requires significant technical ability, both in programming expertise and data science expertise, to create the code.

Embodiments enable multiple data visualizations to be created on the same digital canvas of a graphic design system. For example, the designer can add multiple datasets to the digital canvas (e.g., by manually inputting data, linking a file that includes the data, etc.). The data is then parsed and added to a variable panel where the designer can see the names of the datasets, the type of data associated with each dataset, etc. Once added, the data is available to bind to graphic objects on the digital canvas. Each data visualization that the designer creates can be bound to the same or different datasets. This allows for multiple data visualizations to be created and edited at once, without having to create separate files for each data visualization.

A data visualization is created intuitively on the digital canvas by binding data from one of the added datasets to a graphic object on the digital canvas. For example, a designer can sketch one or more graphic objects on a digital canvas, such as drawing shapes, adding text, etc. The visual properties of the new graphic object (e.g., dimensions, position, scale, color, text, etc.) are then available to be bound to data. In some embodiments, such binding (e.g., associating a visual property of a graphic object with data) can be performed graphically, on the digital canvas. For example, once both a graphic object and a dataset have been added to the digital canvas, the designer can drag a variable from the dataset to a target on the graphic object. When the designer selects the variable (e.g., at the beginning of the drag operation), the available properties of graphic objects on the digital canvas that can be bound to that variable are highlighted with "targets". The available targets may vary depending on the type of data selected (e.g., numerical, categorical, etc.) and the graphic objects on the canvas.

Additionally, because multiple data visualizations can be managed on the same digital canvas, more complex data visualizations can be constructed based on multiple datasets. For example, a double bar chart can be created which represents data from different datasets, allowing for a visual comparison to be made of the datasets. To simplify creation of such complex data visualizations, the axes of different data visualizations can be linked. This linking can include merging the axes, such that they are a common scale, and/or synchronizing the axes, such that they share a zero point.

As such, embodiments simplify and greatly speed up the data visualization creation process, both in creating an initial chart and iterating through creation of multiple charts for a given project. Unlike prior techniques, this management can be performed intuitively within the design tool, without additional coding by the user. Additionally, whereas prior techniques required a separate document for each data visualization, embodiments enable different data visualizations to be driven by different datasets within the same document. This reduces the amount of resources required to complete a project as well as enables the designer to create more complex data visualizations that rely on multiple datasets.

FIG. 1 illustrates a diagram of a process of generating data visualizations based on multiple datasets in accordance with one or more embodiments. As shown in FIG. 1, a data visualization system 100 may enable designers, or other users, to generate data visualizations from underlying source data. Data visualization system 100 may be implemented as part of a graphic design application, such as a vector graphic design application, which enables designers to create various graphic objects (e.g., shapes, lines, text boxes, etc.). In some embodiments, the data visualization system 100 executes on a computing device, such as a PC, laptop, server or any other device including one or more processors capable of executing computer-readable instructions stored on a storage medium.

The data visualization system 100 includes a user interface 102 through which a designer can interact with the data visualization system to create a drawing including graphic objects and bind those graphic objects to data. A user interface manager 104 provides the user interface and manages processing of data received through the user interface 102. Additionally, the user interface manager handles rendering of the user interface based on user inputs and other processing by the data visualization system 100. The user interface 102 may include a digital canvas on which the designer may create various designs (e.g., draw lines and shapes, add text, images, etc.). For example, at numeral 1, the designer can provide a drawing input 106 to create a graphical object. This may include drawing an arbitrary shape in the user interface 102, selecting an existing shape on the digital canvas, etc. For example, if the designer is drawing a bar chart, then the designer may use a shape tool to draw a rectangle (e.g., to represent one of the bars of the bar chart).

As shown at numeral 2, the designer may provide input datasets 108 to the data visualization system. The data may be input directly into the data visualization system (e.g., entered manually, copy pasted, etc.) or provided from another source, such as a file including the dataset (e.g., a spreadsheet, database, etc.). Such a file may be imported from a local storage location (e.g., on the same computing device on which the data visualization system is executing) or a remote storage location accessible via a network. The data visualization system can identify one or more variables associated with the data and present the variables to the user (e.g., via a variable or data user interface element, such as a window, overlay, etc.). In some embodiments, the designer may provide multiple datasets. For example, the designer may provide one dataset, as discussed above, and then similarly provide additional datasets until all desired datasets have been provided. Alternatively, a data source (e.g., file, etc.) may include multiple datasets which are added to the digital canvas when the data source is provided.

At numeral 3, when the input datasets 108 are received, a variable manager 110 identifies one or more variables from the datasets. These variables may be displayed within the GUI 102 (e.g., in a variables panel, list, or other GUI element). In some embodiments, the variables are identified based on a known data format. For example, labels of columns or rows may be extracted from the dataset based on the data format associated with the dataset. The designer can then bind a variable of the dataset to a visual characteristic of one or more graphic objects.

In the example of FIG. 1, at numeral 4, the designer provides a binding input 112 via user interface 102. This may include one or more input selections of graphic objects to be bound to a variable of the input dataset 106. In some embodiments, the binding input 108 includes selecting a variable from a variables panel of the user interface 102 and selecting a target on a graphic object. For example, the designer may click, tap, etc. on the selected variable and then drag to a target on a graphic object. Although embodiments are generally discussed with respect to the use of inputs via mouse, trackpad, finger, etc., embodiments may also be used with different input techniques, such as gaze detection, voice commands etc.

At numeral 5, once the variable and target have been selected, they are passed to object manager 114. Object manager 114 is responsible for managing the appearance of graphic objects, maintaining data bindings between variables and graphic objects, as well as creating additional graphic objects based on the bindings. In some embodiments, the visual characteristics of graphic objects that can be bound may vary depending on the selected variable type. For example, the available visual characteristics which the designer may select may include some or all visual characteristics relating to the type of object selected. For instance, the visual characteristics for a geometric shape object (e.g., a "shape") may include width, height, position, orientation, fill, border, opacity. In some embodiments, the area of an object may also be a bindable visual characteristic. Visual properties for an image may include one or more of the previous properties in addition to contrast and brightness properties, and a text box object may include additional properties, including font and spacing. Additionally, the visual characteristics available for selection can be further based on the type of variable selected. For instance, a number variable type may include visual properties that with numerical property values, such as width, height, position, and orientation. Color of a fill or border may also be presented for number type variables. For text type variables, the color of a fill or border may be presented as visual property types.

At numeral 6, a data binding is created between the selected graphic object and selected variable by object manager 114. The data binding creates a relationship between the data and the selected the visual characteristic of the selected graphic object. Each data visualization that is created has its own data binding, linking the specific visual characteristic of the graphic object with the dataset. In some embodiments, the binding creates and binds one object to each row of data from the corresponding variable of the dataset. For example, when data is bound to a rectangle on the digital canvas, it may be bound to a first row of the data and multiple new rectangles are created and bound for the remaining rows of the data. The data binding may be one to one (e.g., data variable=10 is used to set position x=10 or data variable=#FFFFFF is used to set fill color=#FFFFFF). Alternatively, the relationship has an additional layer of complexity, such as color binding scale, e.g., data variable=50 is used to set the fill color to a grey color between 0=white and 100=black. Similarly, the relationship may define a formula between the data variable value and the property (e.g., data variable=1 is sued to set font format=BOLD while data variable=2 is used to set font format=Italic).

In some embodiments, the data binding is maintained and stored by the object manager 114. For example, the data bindings may be stored in a binding data store 116. In accordance with the association between the variable and the visual property, an observation within the data (such as a row in a spreadsheet) will correspond to a graphic object to which the visual property applies. As discussed, each data observation is mapped to a grouping of graphic objects, which may be referred to as a cell, and at least one graphic object within that cell has a visual property associated with the data variable.

In some embodiments, the object manager 114 also creates additional graphic objects based on the initial graphic object such that each observation in the dataset has a corresponding graphic object. For example, additional graphic objects are created by automatically duplicating or repeating the initial graphic object such that the object type is the same as the initial graphic object. The additional graphic objects may be automatically created and displayed when the designer binds a data variable to a visual property of the initial graphic object. Alternatively, after the binding the designer may instruct the data visualization system to create the additional graphic objects (e.g., by selecting a GUI element). This leads to a data visualization being automatically generated upon binding the initial graphic object to a variable of a dataset. This data visualization includes a plurality of graphic objects that were generated based on the initial graphic object and bound to the same variable of the dataset 108.

In some embodiments, as each object within the plurality of graphic objects is created, the visual property for the object is rendered in accordance with the binding. Specifically, the value for the visual property of a graphic object is based on a variable value for the corresponding observation. This results in data visualization properties 118 which are applied to each graphic object belonging to the data visualization. The new graphic objects may be created such that they are aligned with the initial graphic object in both position and scale. For example, a new coordinate system may be established based on the position of the initial graphic object. The origin of this new coordinate system may correspond to a point, edge, line, or other portion of the initial graphic object, or an offset thereof. This may establish a "zero point" property. By applying the zero-point property to each new graphic object, each graphic object will be aligned. For example, each graphic object may share a starting position on the X axis (e.g., the zero point) but have different positions on the Y axis. Alternative zero points may also be used depending, e.g., on the coordinate space of the data visualization, user input, etc. For example, the zero point may be shared on the Y axis with the X axis position varying between the graphic objects.

Additionally, the visual characteristic of each new graphic object is set such that the value the new graphic object is representing is appropriate relative to the initial graphic object. This results in a scale property which defines a relationship between the bound data value and the visual characteristic value. For example, where the initial graphic object is a bar, the origin may be set to the left edge of the bar. Other origins may also be used, either selected automatically by the data visualization system, by the designer, etc. If the data is bound to the length of the bar, then each newly generated bar's length will be set such that each bar represents that length on the same scale as the initial bar. By sharing the scale property, the graphic objects of the data visualization provide a readily understandable representation of the underlying data and how the data varies from observation to observation. As discussed further below, these data visualization properties 118 may also be synchronized across different data visualizations, enabling data from different datasets to share the same zero point and scale, enabling designers to readily create more complex data visualizations.

There are a number of benefits to working with data bound objects rather than hard coded, or manually constructed visualizations. For example, if the underlying dataset is changed or updated, the corresponding bound visualization is likewise updated. In such an instance, the corresponding data binding is updated by object manager 114 and the updated data binding is stored to binding data store 116, replacing any previous bindings. Any changes to the visual characteristics as a result of the new underlying dataset are automatically rendered accordingly. This saves significant effort that would otherwise be required to update manually constructed charts. Additionally, no specialized coding knowledge is required to create the visualization. Instead, sophisticated data visualizations can be constructed by anyone capable of using a graphic design tool and access to the data to be visualized.

Figure 2:
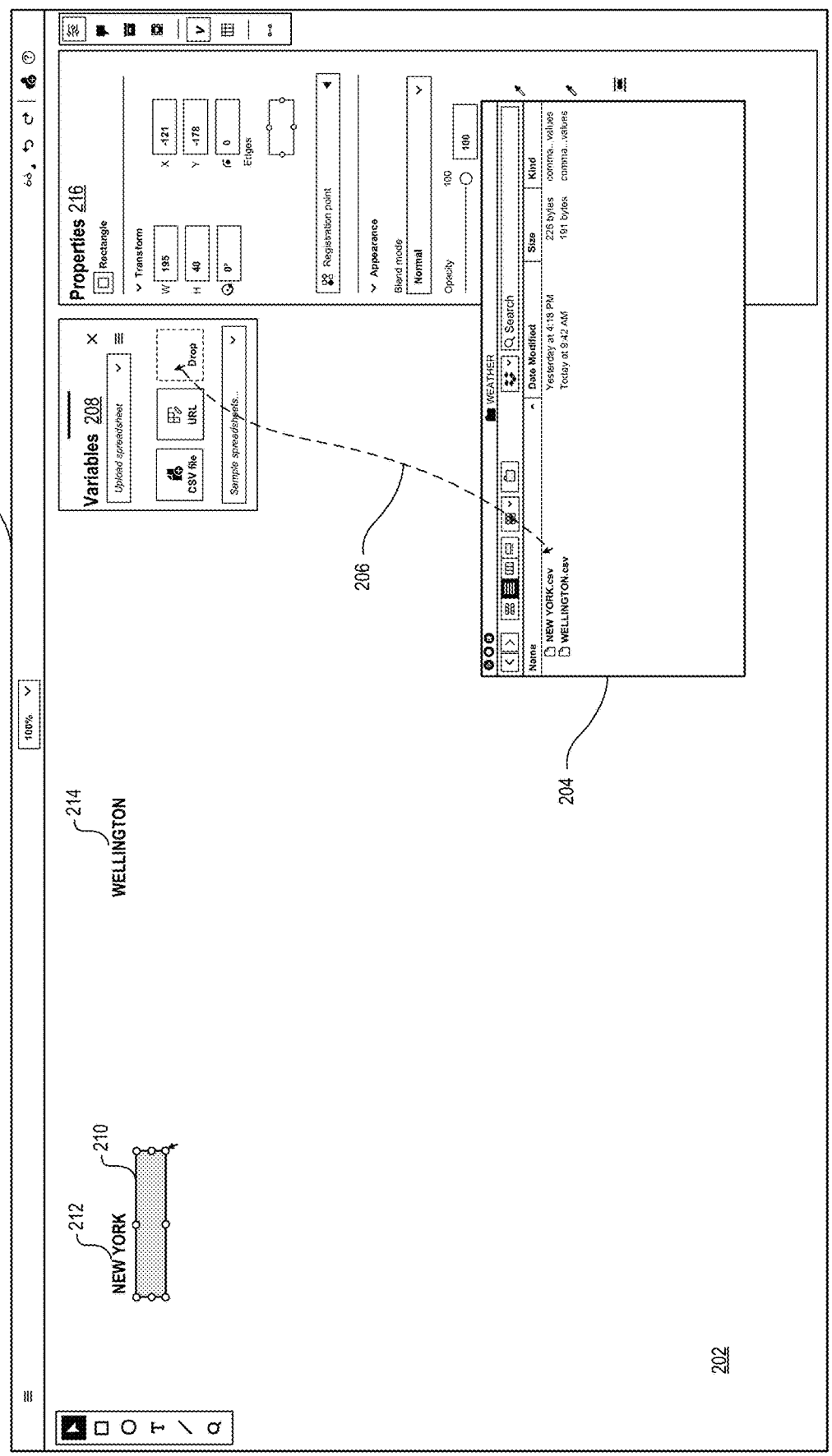
FIG. 2 illustrates a diagram of a user interface that enables generating a data visualization from data bound objects in accordance with one or more embodiments.

FIG. 2 illustrates a diagram of a user interface 200 that enables generating a data visualization from data bound objects in accordance with one or more embodiments. As shown in FIG. 2, the user interface 200 can include a digital canvas 202 which provides an area in which the designer can draw graphic objects, create data visualizations, etc. As discussed, the designer can provide a dataset to be bound to graphic objects. In the example of FIG. 2, the designer has local datasets NEW YORK.csv and WELLINGTON.csv, as shown at 204. In this instance, the designer provides the NEW YORK.csv dataset by dragging and dropping 206 the dataset into variables panel 208. Additionally, in the example of FIG. 2, the designer has drawn a rectangle geometric shape 210 and a text box 212 including the text NEW YORK and a text box 214 including the text WEL- LINGTON. The rectangle 210 has been selected, which results in properties panel 216 showing various properties of the rectangle (e.g., width, height, position, etc.).

Figure 3:
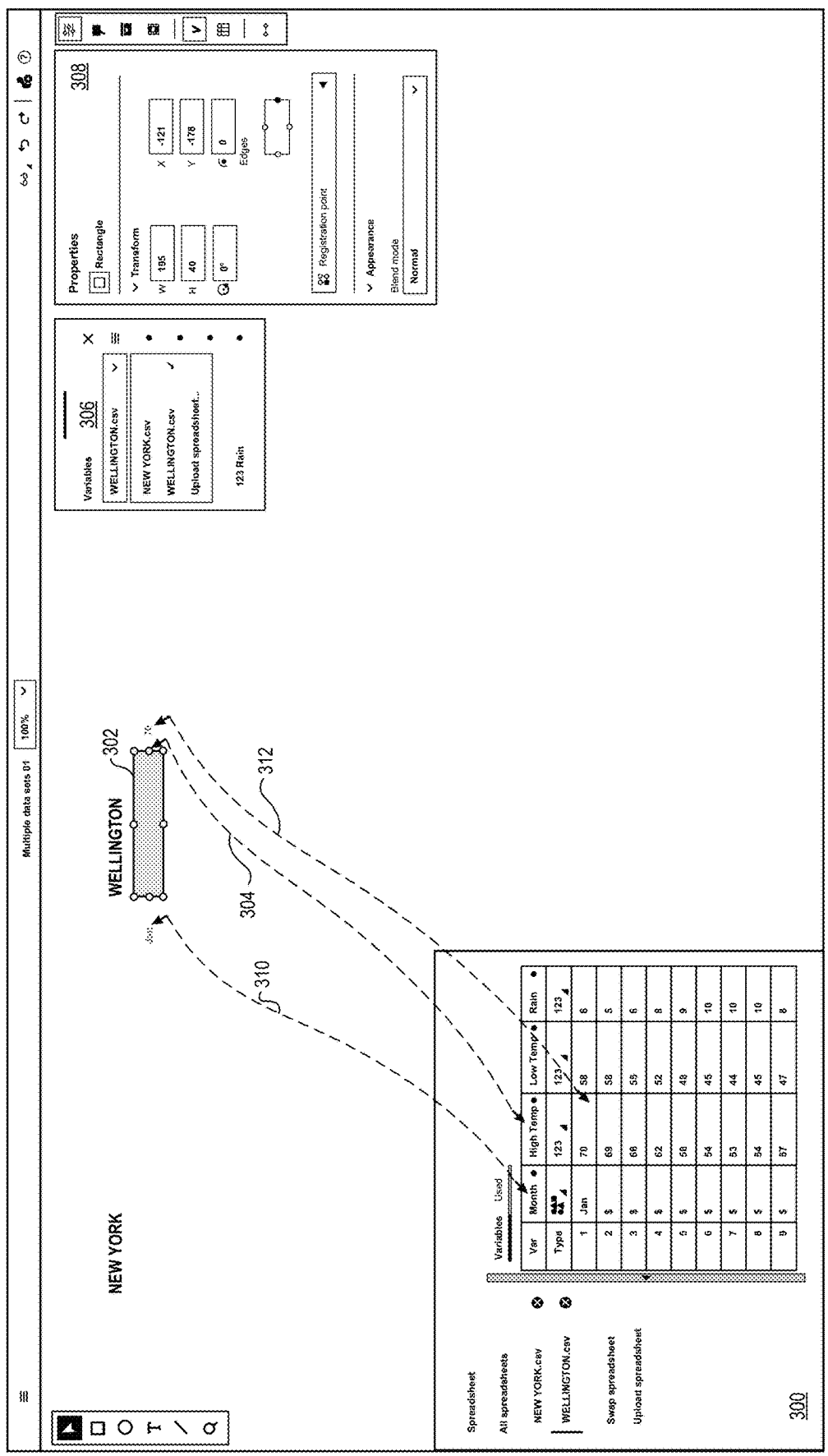
FIG. 3 illustrates a diagram of a user interface showing a digital canvas onto which multiple datasets have been added in accordance with one or more embodiments.

FIG. 3 illustrates a diagram of a user interface showing a digital canvas onto which multiple datasets have been added in accordance with one or more embodiments. In some embodiments, once a new dataset has been added, it can be parsed to identify its variables. The dataset can be viewed in a data panel 300. Data panel 300 can show different types of datasets that have been loaded onto the canvas. For example, the Wellington.csv dataset and the New York.csv dataset are spreadsheets and are therefore displayed in data panel 300 as available spreadsheets.

In the example of FIG. 3, the designer has selected the Wellington.csv dataset in the data panel 300. Using this dataset and graphic object 302, the designer can create a data visualization of one or more variables in the dataset. In this example, the designer binds the high temperature variable to the right edge of the graphic object 302, as shown at 304. This may be performed by dragging the variable (e.g., high temp) from the data panel to the edge of the graphic object. Alternatively, the binding may be performed using the variable panel 306 and properties panel 308.

Once the visual characteristic of the graphic object is bound, then additional graphic objects are automatically created and similarly bound for each observation in the bound dataset. This may be similarly performed for other variables. For example, the designer may bind the Month variable to a text object, as shown at 310, and the temperature data values to a text object, as shown at 312. Additional objects are then similarly created for each observation (e.g., month and temperature value, respectively) from the bound datasets. In the past, the data visualization system only supported a single data visualization at a time, meaning if the designer were to create a second data visualization, such as a similar bar chart for the New York dataset, they would have to create a new document. However, embodiments allow for multiple data visualizations to be managed on the same digital canvas.

Figure 4:
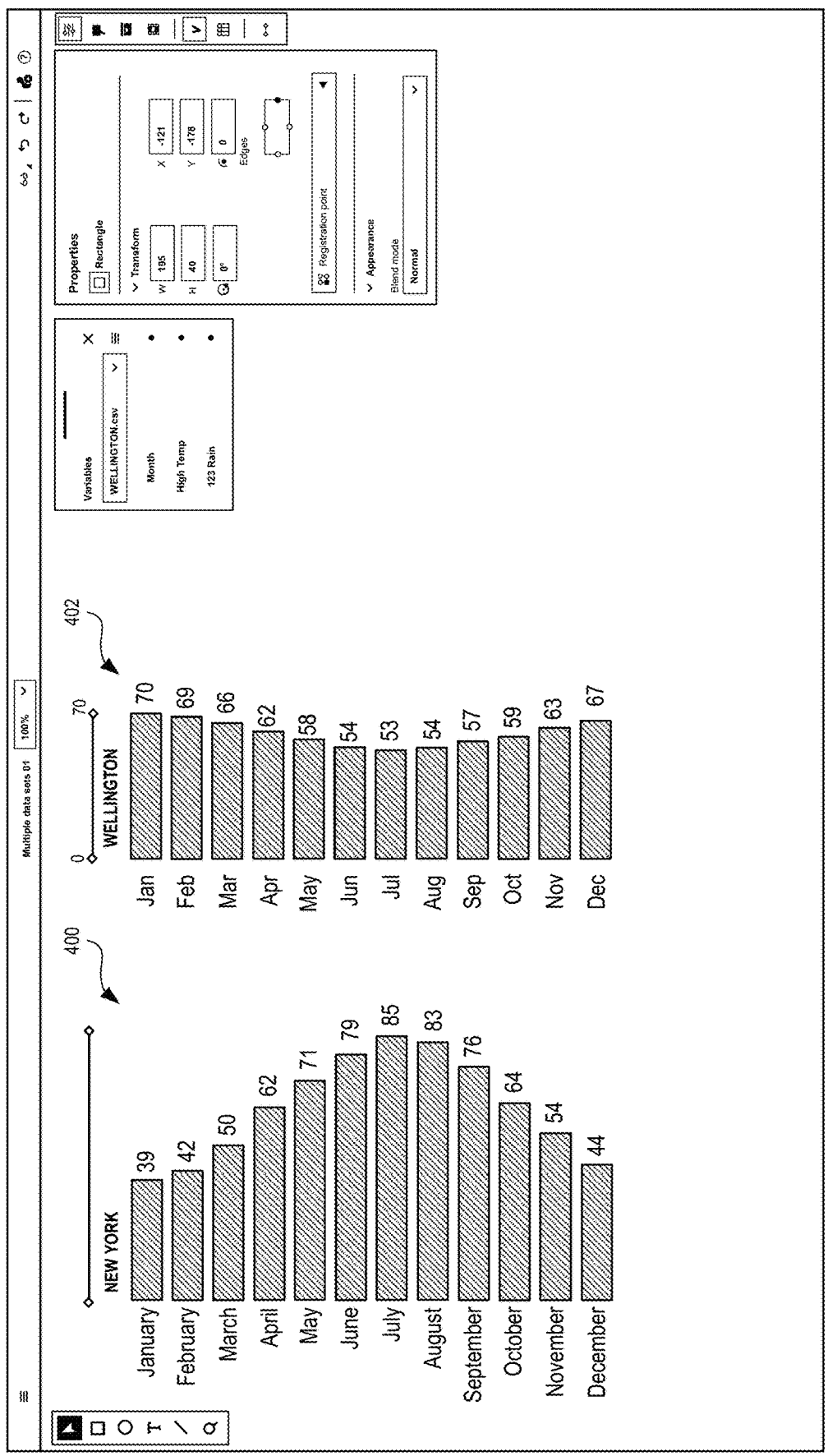
FIG. 4 illustrates a diagram of a user interface showing multiple data visualizations bound to different datasets on the same digital canvas in accordance with one or more embodiments.

Continuing with the example from FIG. 3, FIG. 4 illustrates a diagram of a user interface showing multiple data visualizations bound to different datasets on the same digital canvas in accordance with one or more embodiments. As shown in FIG. 4, a first data visualization 400 has been created and bound to data from the New York.csv dataset and a second data visualization has been created and bound to data from the Wellington.csv dataset. As shown, once the original graphic object(s) are bound, the remainder of the data visualization is automatically populated with additional graphic objects for the rest of the datasets. In this instance, this results in a complete bar chart of the high temperatures in New York and Wellington.

Having multiple data visualization on the same document allows for more accurate and more efficient data visualizations to be generated. For example, by creating the data visualizations in the same document, the designer can ensure the same styles are applied and make fewer mistakes as compared to working across documents. Additionally, new data visualizations can be quickly created by, for example, duplicating one data visualization and changing the underlying bound dataset. This way, all styles, colors, properties, etc. are preserved, preventing unintended changes from being made between data visualizations. However, there are additional benefits. For example, more complex data visualizations can be created from multiple data visualizations bound to different datasets. In some embodiments, after duplicating one data visualization, the data binding may be removed and a new binding to a different visual property may be added.

As discussed, once multiple data visualizations have been created, they can be managed together on the same digital canvas. In some embodiments, such management includes combining the axes of the data visualizations. For example, when a data visualization is created, a scale property is used to map the data value to the visual characteristic. This scale property is typically created based on the current value of the visual characteristics and the first observation value from the dataset at the time of binding. This means that different data visualizations that are showing the same type of data, may each have different scales. In the example of FIG. 4, the New York data visualization 400 and the Wellington data visualization 402 have different scales. This is evident by observing that the January bar for Wellington (representing a temperature of 70 degrees) is significantly shorter than the May bar for New York (representing a temperature of 71 degrees). Such inconsistencies can make data visualizations visually confusing and/or misleading, making them difficult to understand.

In some embodiments, the same data visualization may include data bindings to different datasets. For example, one visual property of a graphic object may be bound to one dataset and another visual property of the graphic object may be bound to a different dataset. For example, one dataset may be bound to a position of graphic objects of the data visualization while another dataset may be bound to an area of the graphic objects. This allows for data visualizations that visually depict data in different dimensions.

Figure 5:
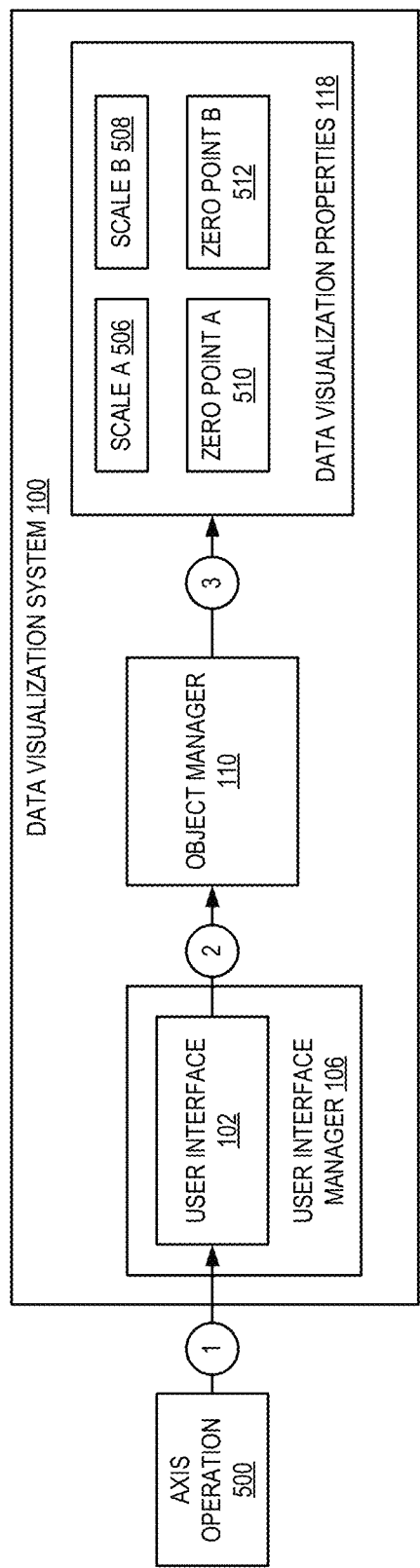
FIG. 5 illustrates a diagram of a process of combining axes of data visualizations in accordance with one or more embodiments.

FIG. 5 illustrates a diagram of a process of combining axes of data visualizations in accordance with one or more embodiments. Embodiments enable designers to quickly and easily combine axes of different data visualizations to make the data visualizations clear and consistent. Once multiple data visualizations have been created, the designer can be presented with multiple axis management options (e.g., via various GUI elements, command line/terminal inputs, etc.). For example, at numeral 1, the designer may select an axis operation 500 via user interface 102. This may include selecting a GUI element associated with an axis synchronization operation and/or a zero-point synchronization operation. In some embodiments, the axis combination operations may become available when all or a portion of elements belonging to two different data visualizations have been selected on the digital canvas. Additionally, or alternatively, after selecting the axis combination operation, the designer may be prompted to select or otherwise identify two or more data visualizations on the digital canvas to which the operation is to be applied.

At numeral 2, the selected operation is passed to object manager 114 along with identifiers associated with the data visualizations being managed. Object manager 114 can then update the data visualization properties 118 based on the axis input 500. At numeral 3, the object manager can identify a data visualization property associated with each selected data visualization and synchronize the properties. For example, if the operation is an axis synchronization operation, then the object manager 114 identifies a scale associated with each selected data visualization. In this example, those scales may include scale A 506, associated with a first data visualization, and scale B 508 associated with a second data visualization.

In some embodiments, the object manager 114 automatically updates each scale to match the scale of the first selected data visualization. Additionally, or alternatively, the designer may specify the scale that is to be matched. For example, if the designer selects data visualization A and data visualization B, corresponding to scale A 506 and scale B 508, respectively, the designer may then specify that scale A is to be replaced by scale B (or vice versa). Although two scales are shown in the example of FIG. 5, in various embodiments the data visualization properties 118 may include as many scale properties as there are data visualizations on a given digital canvas. Once synced, updated data visualization(s) are rendered in the user interface 102 using the updated scale(s).

Similarly, in some embodiments, the axis operation 500 includes a zero-point synchronization operation. In such instances, the object manager 114 identifies a zero-point property associated with each selected data visualization. For example, those zero-point properties may include zero-point A 510, associated with a first data visualization, and zero-point B 510 associated with a second data visualization. In some embodiments, the object manager 114 automatically updates each zero point to match the zero point of the first selected data visualization. Additionally, or alternatively, the designer may specify the zero point that is to be matched. As with scales, although two zero point are shown in the example of FIG. 5, in various embodiments the data visualization properties 118 may include as many zero-point properties as there are data visualizations on a given digital canvas. Once synced, updated data visualization(s) are rendered in the user interface 102 using the updated zero point(s).

Figure 6:
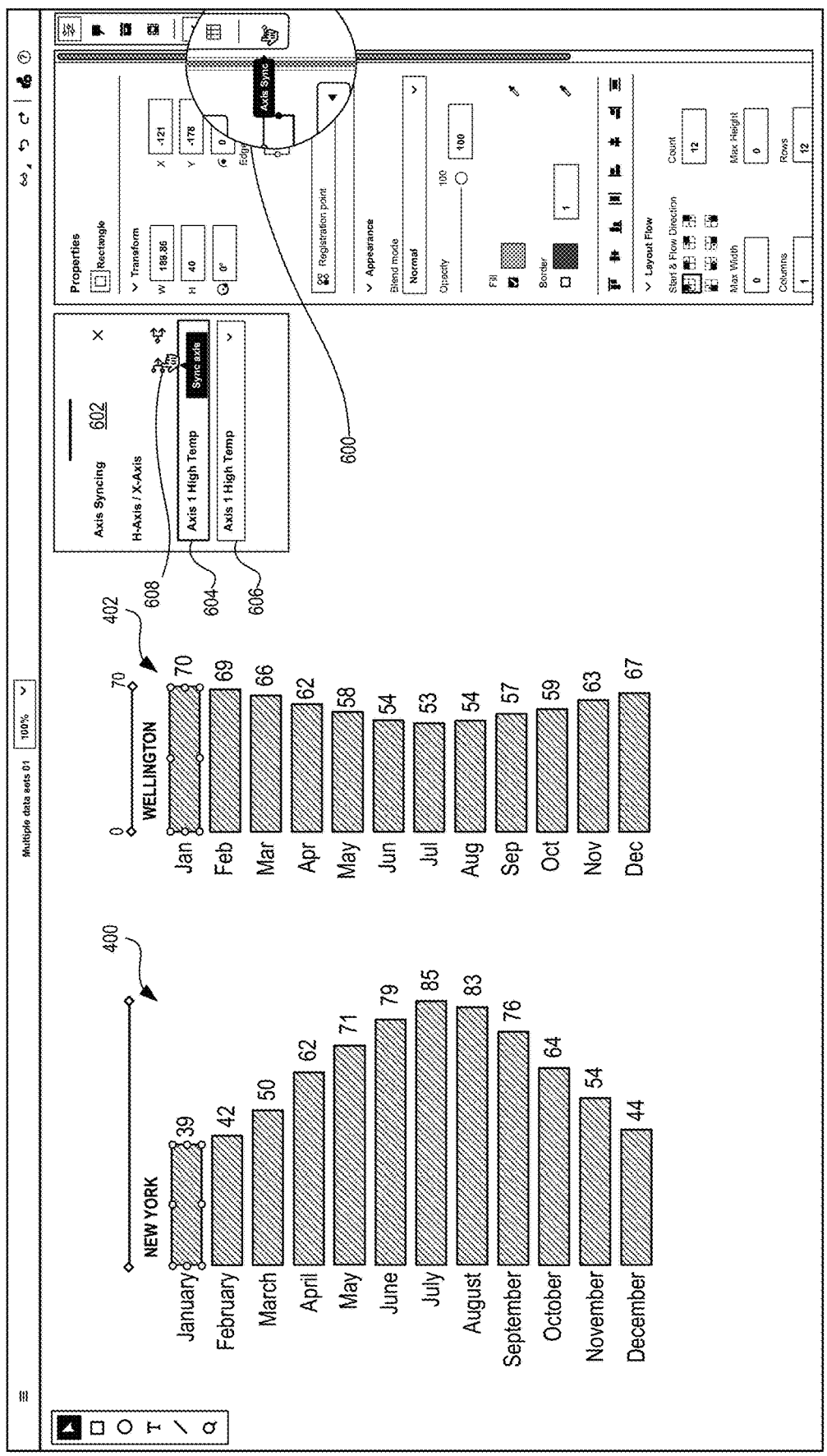
FIGS. 6-7 illustrate a diagram of a user interface showing axis synchronization of multiple data visualizations bound to different datasets in accordance with one or more embodiments.
Figure 7:
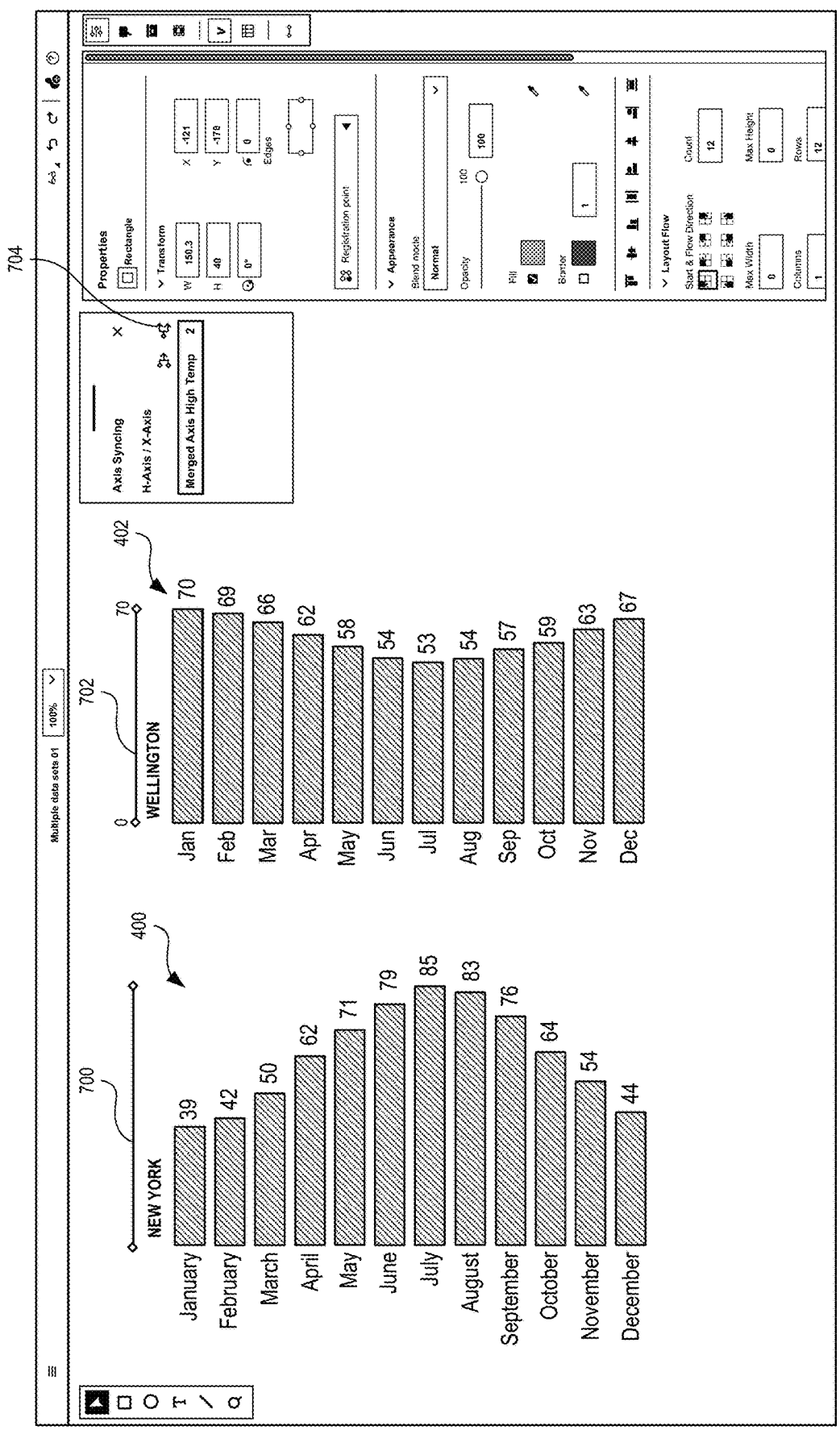

FIGS. 6-7 illustrate a diagram of a user interface showing axis synchronization of multiple data visualizations bound to different datasets in accordance with one or more embodiments. As shown in FIG. 6, the designer selects a GUI element 600 corresponding to an axis sync operation. In some embodiments, the designer first selects all or some of the graphic objects associated with two or more data visualizations. Alternatively, the axis sync element 600 can be selected without first selecting any data visualizations. Once selected, an axis syncing panel 602 is displayed on the digital canvas which presents axis sync options for the data visualization on the digital canvas.

The designer can then select the axes that are to be synced. For example, the axis syncing panel 602 may include a number of axis selection elements 602, 604 equal to the number of data visualizations currently on the digital canvas. In such an instance, the designer may select each axis to be synced from a list or other structure. In some embodiments, the first axis selected may be used as the dominant axis (e.g., all other selected axes will be set to the scale of the dominant axis). In some embodiments, if the designer selected two or more data visualizations prior to selecting the axis sync operation 600, then the axis selection elements 602, 604 may already be populated.

Once the axes have been selected, the designer can then select the sync axis element 610. Upon selection, the object manager is provided with identifiers for the selected data visualizations and synchronizes the scale properties as discussed above. In this example, this results in data visualizations 402 being redrawn based on the new scale property, as shown in FIG. 7. As a result, the length of the bars of each data visualization now depicts the same temperature values consistently. Additionally, if the scale of one data visualization is adjusted (e.g., using the scale control element 700, 702), both data visualizations are adjusted accordingly. Should the designer choose to edit the data visualizations independently again, they may select desync element 704 which allows for each data visualizations scale property to be independently edited again.

Figure 8:
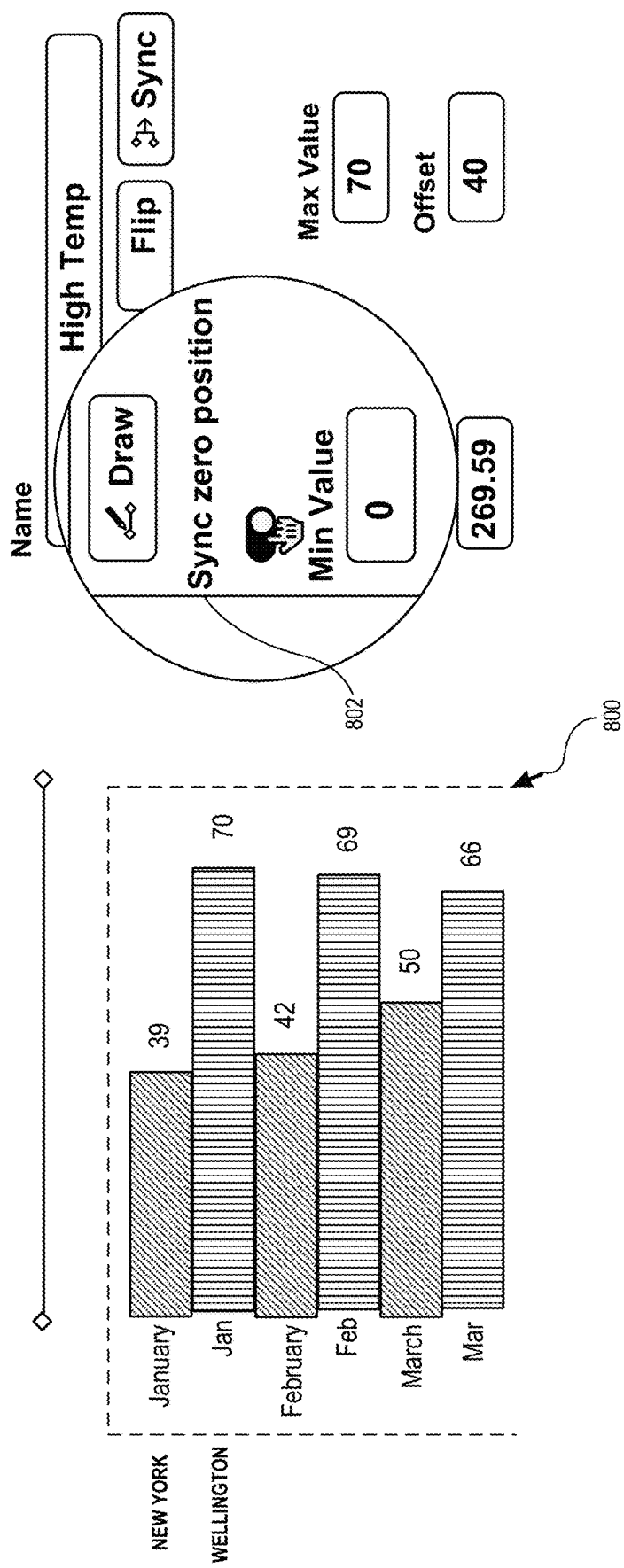
FIGS. 8-9 illustrate a diagram of a user interface showing zero position synchronization of multiple data visualizations bound to different datasets in accordance with one or more embodiments.
Figure 9:
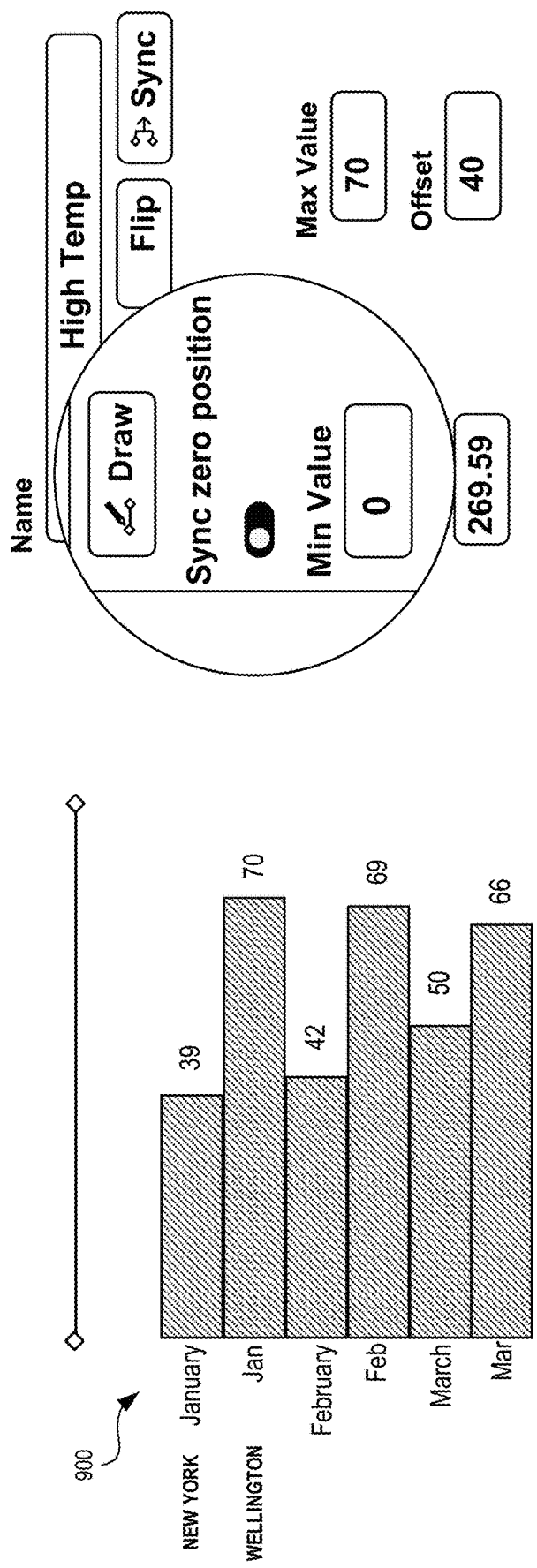

FIGS. 8-9 illustrate a diagram of a user interface showing zero position synchronization of multiple data visualizations bound to different datasets in accordance with one or more embodiments. As shown in FIG. 8, multiple data visualizations can be combined into one data visualization. In the example of FIG. 8, the bars of the New York data visualization, as shown in prior figures, are interleaved with the bars of the Wellington data visualization, from prior figures. Because each data visualization is made of ordinary graphic objects, they can be easily manipulated by the designer. For example, the spacing between bars can be expanded such that the two charts can be combined.

Such combinations of data visualizations can provide designers with very powerful visual aids to explain and/or compare datasets. However, it can be difficult and time consuming to combine different data visualizations in a way that is visually appealing. In particular, alignment of the individual graphic objects, particularly for data visualizations made of a large number of graphic objects, can be a challenge. As such, embodiments enable the zero position of data visualizations to be synchronized. As discussed, when a data visualization is created, a zero-position property is set. When new graphic objects are created (e.g., upon binding a dataset to an initial graphic object), they each share the zero-position property. This ensures that each new graphic object is aligned with the initial graphic object.

In some embodiments, this zero-position property can be synchronized across data visualizations. This ensures that each synchronized data visualization is aligned with one another. For example, the designer can select all or a portion of graphic objects associated with two or more data visualizations, as shown at 800. Once selected, the designer can select a sync zero position element 802. When the sync zero position element 802 is selected, the object manager identifies the data visualizations associated with the selected graphic objects and retrieves the zero-position property associated with the data visualizations. The object manager then sets the zero-position property of the data visualizations to the same value. In some embodiments, the designer can select which zero position is to be used as the zero position for the data visualizations. Alternatively, the data visualization system may automatically set the zero position for the first selected data visualization, or other default selection technique. This results in aligned data visualizations as shown at 900 in FIG. 9, as each graphic object now has the same zero point. In some embodiments, the designer may specify an offset value relative to the zero point to be applied to the graphic objects. In such instances, the graphic objects share both the zero point and the offset value.

In some embodiments, only the selected graphic objects have their zero points updated. For example, if the designer selects some graphic objects from multiple data visualizations, not all graphic objects of both data visualizations have their zero points synchronized. Instead, only the selected graphic objects zero points are synchronized.

Figure 10:
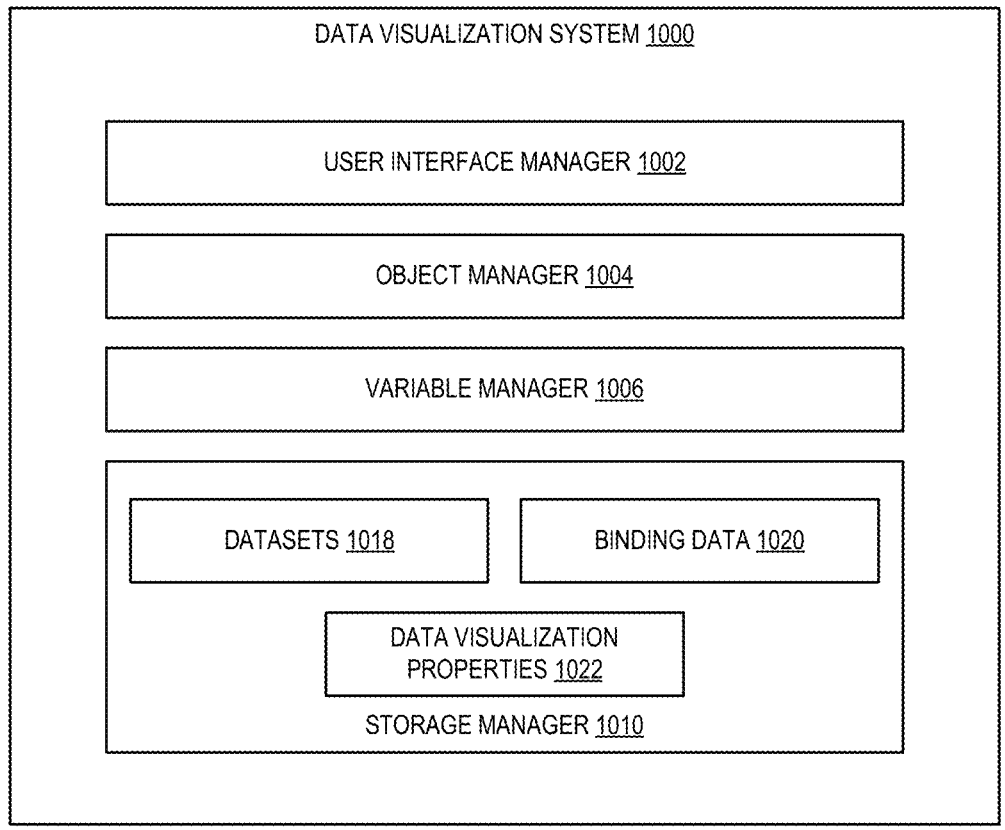
FIG. 10 illustrates a schematic diagram of a data visualization system in accordance with one or more embodiments.

FIG. 10 illustrates a schematic diagram of data visualization system 1000 (e.g., "data visualization system" described above) in accordance with one or more embodiments. As shown, the data visualization system 1000 may include, but is not limited to, user interface manager 1002, object manager 1004, variable manager 1006, and storage manager 1010. The storage manager 1010 includes datasets 1018, data bindings 1020, and data visualization properties 1022.

As illustrated in FIG. 10, the data visualization system 1000 includes a user interface manager 1002. For example, the user interface manager 1002 allows users to create graphic objects and bind them to data to create data visualizations. In some embodiments, the user interface manager 1002 provides a user interface through which the user can interact with the data visualization system and individual data visualizations, as discussed above. Alternatively, or additionally, the user interface may enable the user to download data visualizations from a local or remote storage location (e.g., by providing an address (e.g., a URL or other endpoint) associated with a storage location).

Additionally, the user interface manager 1002 allows users manage multiple data visualizations. For example, the user interface manager can render a user interface that includes axis operations elements. The designer can select an axis operation and the data visualizations on which the operation is to be performed. As discussed, the axis operations can include an axis synchronization operation, where the scale property of multiple data visualizations is synchronized, and/or a zero-point synchronization operation, where the zero-point property of multiple data visualizations (or some or all graphic objects associated with multiple data visualizations) are synchronized. This allows for more complex data visualizations to be readily created.

As illustrated in FIG. 10, the data visualization system 1000 includes an object manager 1004. The object manager 1004 is responsible for binding graphic objects to a dataset. In particular, the object manager can be used to construct a data visualization from scratch, as discussed above. For example, the object manager 1004 binds a visual characteristic of a graphic object to a variable from a dataset 1018. In some embodiments, there may be a visual indicator of the binding. In some embodiments, the data bindings 1020 are maintained and stored by the object manager or storage manager. The binding represents a relationship between the visual characteristic and the data values of the variable. This can be a one-to-one relationship, a linear relationship, a non-linear relationship, a relationship defined by a specific formula, etc.

As a result of the data binding, any change to the data in the dataset to which it is bound results in a change to the visual characteristic of the graphic object. Likewise, if the underlying dataset associated with the binding is swapped for another dataset, then the bindings are updated to be associated with the new dataset. The bound visual characteristic is then automatically updated to reflect the new dataset. Further, when the data is bound to a graphic object, if the variable is associated with multiple observations, then multiple graphic objects may be created and bound, each having the same visual characteristic bound to the dataset.

The object manager 1004 is also responsible for managing properties for data visualizations and/or graphic objects. As discussed, when a new data visualization is created, a zero-point property and a scale property are created. When an axis synchronization operation is received, the operation type (e.g., zero point or scale) and two or more data visualization identifiers are provided to the object manager 1004. The object manager then retrieves the properties associated with the selected data visualizations and sets them to the same value (e.g., set to the value of one of the data visualizations). The updated data visualizations are then rendered by the user interface manager.

As illustrated in FIG. 10, the data visualization system 1000 includes variable manager 1006. When a new dataset is received (e.g., uploaded, manually entered, etc.), the variable manager 1006 is responsible for identifying one or more variables from the datasets. For example, the variable manager 1006 may parse the dataset based on a format of the dataset to identify one or more variables included in the dataset. These variables may be displayed within the user interface (e.g., in a variables panel, list, or other GUI element). In some embodiments, the variables are identified based on a known data format. For example, labels of columns or rows may be extracted from the dataset based on the data format associated with the dataset. The designer can then bind a variable of the dataset to a visual characteristic of one or more graphic objects. Additionally, the variable manager 1006 identifies a data type associated with each variable (e.g., text data, numerical data, etc.).

As illustrated in FIG. 10, the data visualization system 1000 also includes the storage manager 1010. The storage manager 1010 maintains data for the data visualization system 1000. The storage manager 1010 can maintain data of any type, size, or kind as necessary to perform the functions of the data visualization system 1000. The storage manager 1010, as shown in FIG. 10, includes the datasets 1018. As discussed, datasets 1018 can be input directly into the data visualization system (e.g., entered manually, copy pasted, etc.) or provided from another source, such as a file including the dataset (e.g., a spreadsheet, database, etc.). Such a file may be imported from a local storage location (e.g., on the same computing device on which the data visualization system is executing) or a remote storage location accessible via a network. The data visualization system can identify one or more variables associated with the data and present the variables to the user (e.g., via a variable or data user interface element, such as a window, overlay, panel, etc.).

As further illustrated in FIG. 10, the storage manager 1010 also includes data bindings 1020. As discussed, the data bindings represent a relationship between a visual characteristic and data. The data binding creates a relationship between the data and the selected the visual characteristic of the selected graphic object. In some embodiments, the binding creates and binds one object to each row of data from the corresponding variable of the dataset. The data binding may be one to one (e.g., data variable=10 is used to set position x=10 or data variable=#FFFFFF is used to set fill color=#FFFFFF). Alternatively, the relationship has an additional layer of complexity, such as color binding scale, e.g., data variable=50 is used to set the fill color to a grey color between 0=white and 100=black. Similarly, the relationship may define a formula between the data variable value and the property (e.g., data variable=1 is sued to set font format=BOLD while data variable=2 is used to set font format=Italic). If the underlying data is swapped, then the binding(s) 1020 are updated using the new dataset.

As further illustrated in FIG. 10, the storage manager also includes data visualization properties 1022. As discussed, when data is bound to a graphic object, additional graphic objects are created for each observation in the dataset. These new graphic objects have a visual property that is rendered in accordance with the data binding. For example, the value for the visual property of a graphic object is based on a variable value for the corresponding observation. To ensure that each graphic object is created consistently with the data visualization, the data visualization system 1000 maintains data visualization properties 1022 which are applied to each graphic object belonging to a given data visualization.

In some embodiments, the data visualization properties 1022 include at least a scale property and a zero-point property. The zero-point property is used to align new graphic objects as they are created. For example, a new coordinate system may be established based on the position of the initial graphic object. The origin of this new coordinate system, which may correspond to a point, edge, line, or other portion of the initial graphic object, or an offset thereof, is the zero point for graphic objects belonging to this data visualization. By applying the zero-point property to each new graphic object, each graphic object will be aligned. For example, each graphic object may share a starting position on the X axis (e.g., the zero point) but have different positions on the Y axis. Alternative zero points may also be used depending, e.g., on the coordinate space of the data visualization, user input, etc. For example, the zero point may be shared on the Y axis with the X axis position varying between the graphic objects.

The scale data visualization property ensures that new graphic objects represent values of the dataset consistently with the initial graphic object. The scale property may define a relationship between the bound data value and the visual characteristic value. For example, where the initial graphic object is a bar, if the data is bound to the length of the bar, then each newly generated bar's length will be set such that each bar represents that length on the same scale as the initial bar. By sharing the scale property, the graphic objects of the data visualization provide a readily understandable representation of the underlying data and how the data varies from observation to observation.

Each of the components 1002-1010 of the data visualization system 1000 and their corresponding elements (as shown in FIG. 10) may be in communication with one another using any suitable communication technologies. It will be recognized that although components 1002-1010 and their corresponding elements are shown to be separate in FIG. 10, any of components 1002-1010 and their corresponding elements may be combined into fewer components, such as into a single facility or module, divided into more components, or configured into different components as may serve a particular embodiment.

The components 1002-1010 and their corresponding elements can comprise software, hardware, or both. For example, the components 1002-1010 and their corresponding elements can comprise one or more instructions stored on a computer-readable storage medium and executable by processors of one or more computing devices. When executed by the one or more processors, the computer-executable instructions of the data visualization system 1000 can cause a client device and/or a server device to perform the methods described herein. Alternatively, the components 1002-1010 and their corresponding elements can comprise hardware, such as a special purpose processing device to perform a certain function or group of functions. Additionally, the components 1002-1010 and their corresponding elements can comprise a combination of computer-executable instructions and hardware.

Furthermore, the components 1002-1010 of the data visualization system 1000 may, for example, be implemented as one or more stand-alone applications, as one or more modules of an application, as one or more plug-ins, as one or more library functions or functions that may be called by other applications, and/or as a cloud-computing model. Thus, the components 1002-1010 of the data visualization system 1000 may be implemented as a stand-alone application, such as a desktop or mobile application. Furthermore, the components 1002-1010 of the data visualization system 1000 may be implemented as one or more web-based applications hosted on a remote server. Alternatively, or additionally, the components of the data visualization system 1000 may be implemented in a suite of mobile device applications or "apps."

Figure 11:
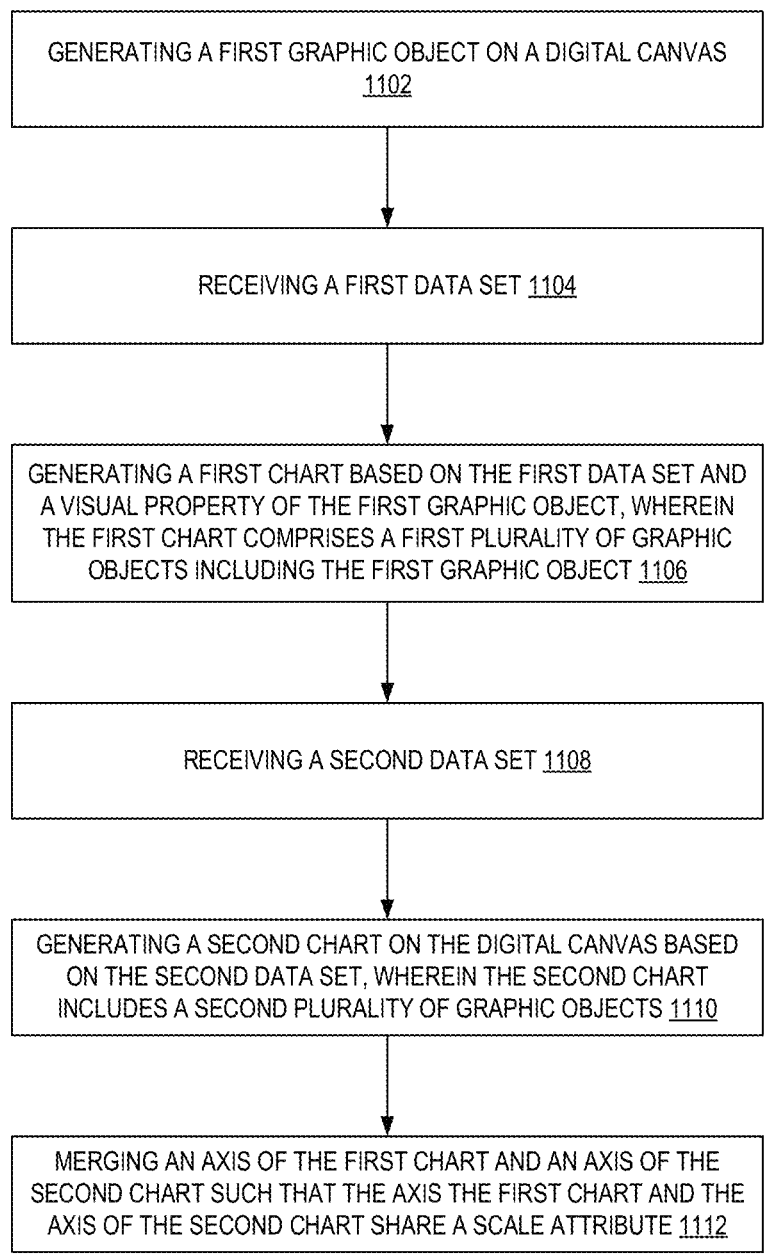
FIG. 11 illustrates a flowchart of a series of acts in a method of managing multiple data visualization bound to different datasets in accordance with one or more embodiments.

FIGS. 1-10, the corresponding text, and the examples, provide a number of different systems and devices that allows a user to change coordinate systems for data bound objects. In addition to the foregoing, embodiments can also be described in terms of flowcharts comprising acts and steps in a method for accomplishing a particular result. For example, FIG. 11 illustrates a flowchart of an exemplary method in accordance with one or more embodiments. The method described in relation to FIG. 11 may be performed with fewer or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart 1100 of a series of acts in a method of managing multiple data visualization bound to different datasets in accordance with one or more embodiments. In one or more embodiments, the method 1100 is performed in a digital medium environment that includes the data visualization system 1000. The method 1100 is intended to be illustrative of one or more methods in accordance with the present disclosure and is not intended to limit potential embodiments. Alternative embodiments can include additional, fewer, or different steps than those articulated in FIG. 11.

As illustrated in FIG. 11, the method 1100 includes an act 1102 of generating a first graphic object on a digital canvas. As discussed, a data visualization may include a digital canvas. The digital canvas may include a variety of drawing tools that enable a designer to draw on the canvas. For example, the designer may sketch a shape on a digital canvas shape tool. The designer may similarly add lines, curves, or other path objects, add or change color fills, or otherwise add or modify visual properties of graphic objects on the digital canvas. Additionally, or alternatively, the designer may add text to a text box, import an image, etc.

As illustrated in FIG. 11, the method 1100 also includes an act 1104 of receiving a first dataset. As discussed, the designer may add the dataset to the data visualization system directly (e.g., manual entry, copy-paste, etc.) or via a file that includes the dataset (e.g., a spreadsheet, database, etc.).

As illustrated in FIG. 11, the method 1100 also includes an act 1106 of generating a first chart based on the first dataset and a visual property of the first graphic object, wherein the first chart comprises a first plurality of graphic objects including the first graphic object. In some embodiments, the first chart is generated by binding the first dataset to the visual property of the first graphic object. As discussed, upon binding the dataset to the visual property of the first graphic object, additional graphic objects are created for each observation in the bound dataset.

As illustrated in FIG. 11, the method 1100 also includes an act 1108 of receiving a second dataset. Similar to the first dataset, the second dataset may be added by the designer directly or via a file. In some embodiments, the second dataset may be included in the same file as the first dataset.

As illustrated in FIG. 11, the method 1100 also includes an act 1110 of generating a second chart on the digital canvas based on the second dataset, wherein the second chart includes a second plurality of graphic objects. As with the first chart, the second chart is created by binding the second dataset to a visual property of the second graphic object.

As illustrated in FIG. 11, the method 1100 also includes an act 1112 of merging an axis of the first chart and an axis of the second chart such that the axis the first chart and the axis of the second chart share a scale attribute. Once both charts have been created, they can be managed together. For example, as discussed, each chart is associated with data visualization properties such as a scale and a zero point. These properties can be shared between charts, or other data visualizations, which allows for different data visualizations on the same digital canvas to be quickly combined, aligned, etc., creating more complex data visualizations.

As discussed, the scale attribute (also referred to herein as a scale property) defines a relationship between the data value of an observation and a visual property value of a graphic object. By sharing a scale property for each graphic object of a data visualization, each graphic object represents the underlying dataset consistently. The scale attribute is determined when the data visualization is created. For example, in some embodiments, the method includes an act of determining a first scale attribute associated with the first chart based on the first dataset, the visual property of the first graphic object, and a property of the first chart.

The scale attribute can be shared across data visualizations also, allowing for different data visualizations bound to different datasets to represent data consistently. For example, if each dataset represents measurements of the same phenomena, then sharing a scale makes the two charts easier to understand, and compare visually, by a viewer. In some embodiments, merging an axis of the first chart and an axis of the second chart, further includes binding a second scale attribute associated with the second chart to the first scale attribute.

This may include setting the scale of a first data visualization to equal the scale of a second data visualization. If the scale of designer changes the scale (e.g., resizes) the second data visualization, then the first data visualization is likewise updated as it shares the same scale. For example, in some embodiments, the method further includes an act of resizing the first chart based on a user input, determining a new scale attribute associated with the resized first chart, and resizing the second chart based on the new scale attribute.

In some embodiments, merging an axis of the first chart and an axis of the second chart, further includes syncing a zero point of the axis of the first chart with a zero point of the axis of the second chart. This may include setting a zero-point property associated with the second chart to be equal to a zero-point property associated with the first chart. In some embodiments, the zero-point property of the first chart corresponds to an origin point of chart coordinate system associated with the first chart.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
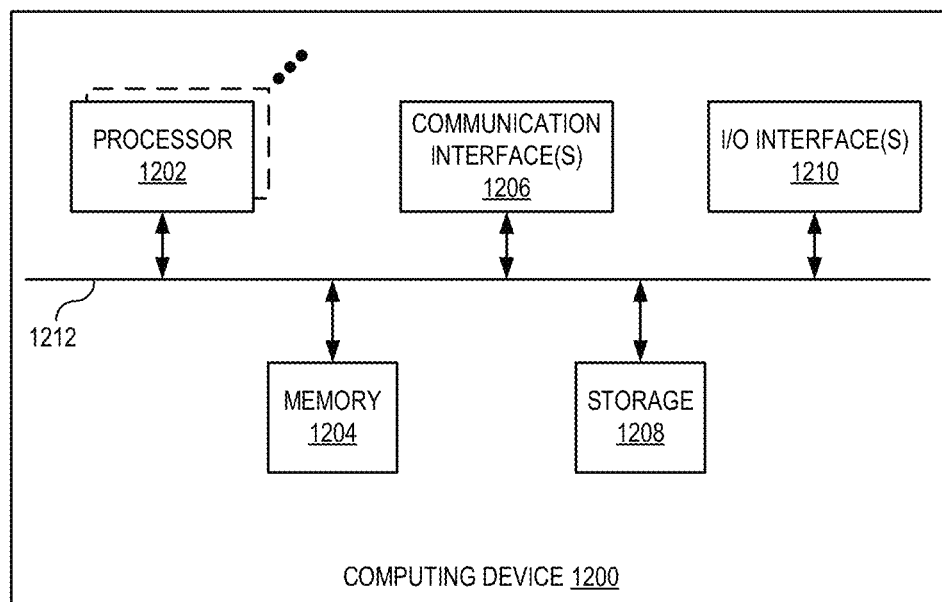
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the data visualization system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
generating a first graphic object on a digital canvas;
receiving a first dataset;
generating a first chart based on the first dataset and a visual property of the first graphic object, wherein the first chart comprises a first plurality of graphic objects including the first graphic object, and wherein the first chart is associated with a first zero-position property for each of the first plurality of graphic objects;
receiving a second dataset;
generating a second chart on the digital canvas based on the second dataset, wherein the second chart includes a second plurality of graphic objects, wherein the second chart is associated with a second zero-position property for each of the second plurality of graphic objects, and wherein the second zero-position property is different from the first zero-position property; and
generating a third chart including the first plurality of graphic objects and the second plurality of graphic objects, wherein the second zero-position property for each of the second plurality of graphic objects is set to a value of the first zero-position property.

2. The method of claim 1, further comprising:
determining a first scale attribute associated with the first chart based on the first dataset, the visual property of the first graphic object, and a property of the first chart.

3. The method of claim 2, further comprising:
merging an axis of the first chart and an axis of the second chart by binding a second scale attribute associated with the second chart to the first scale attribute.

4. The method of claim 1, further comprising:
resizing the first chart based on a user input;
determining a new scale attribute associated with the resized first chart; and
resizing the second chart based on the new scale attribute.

5. The method of claim 1, wherein the first zero-position property of the first chart corresponds to an origin point of chart coordinate system associated with the first chart.

6. A non-transitory computer-readable medium storing executable instructions, which when executed by a processing device, cause the processing device to perform operations comprising:
generating a first graphic object on a digital canvas;
receiving a first dataset;
generating a first chart based on the first dataset and a visual property of the first graphic object, wherein the first chart comprises a first plurality of graphic objects including the first graphic object, and wherein the first chart is associated with a first zero-position property for each of the first plurality of graphic objects;
receiving a second dataset;
generating a second chart on the digital canvas based on the second dataset, wherein the second chart includes a second plurality of graphic objects, wherein the second chart is associated with a second zero-position property for each of the second plurality of graphic objects, and wherein the second zero-position property is different from the first zero-position property; and
generating a third chart including the first plurality of graphic objects and the second plurality of graphic objects, wherein the second zero-position property for each of the second plurality of graphic objects is set to a value of the first zero-position property.

7. The non-transitory computer-readable medium of claim 6, wherein the operations further comprise:
determining a first scale attribute associated with the first chart based on the first dataset, the visual property of the first graphic object, and a property of the first chart.

8. The non-transitory computer-readable medium of claim 7, wherein the operations further comprise:
merging an axis of the first chart and an axis of the second chart by binding a second scale attribute associated with the second chart to the first scale attribute.

9. The non-transitory computer-readable medium of claim 6, wherein the operations further comprise:
resizing the first chart based on a user input;
determining a new scale attribute associated with the resized first chart; and
resizing the second chart based on the new scale attribute.

10. The non-transitory computer-readable medium of claim 6, wherein the first zero-position property of the first chart corresponds to an origin point of chart coordinate system associated with the first chart.

11. A system comprising:
a memory component; and
a processing device coupled to the memory component, the processing device to perform operations comprising:
receiving a request to create a plurality of graphic objects on a digital canvas;
receiving a plurality of datasets;
generating a representation of each dataset in a data panel associated with the digital canvas;
binding a first visual property of a first graphic object with a first dataset from the data panel to generate a first chart, wherein the first graphic object is associated with a first zero-position property;
binding a second visual property of a second graphic object with a second dataset from the data panel to generate a second chart, wherein the second graphic object is associated with a second zero-position property; and
generating a third chart with a merged zero-position property for the first graphic object and the second graphic object based on the first zero-position property for the first graphic object and the second zero-position property for the second graphic object.

12. The system of claim 11 wherein the operations further comprise:
receiving a request to merge axis properties of the first chart and the second chart.

13. The system of claim 12, wherein the operation of receiving a request to merge axis properties of the first chart and the second chart, further comprises:
receiving a request to merge a scale attribute of the first chart and the second chart.

14. The system of claim 13, wherein the operations further comprise:
determining a first scale attribute associated with the first chart; and binding a second scale attribute associated with the second chart to the first scale attribute.

15. The system of claim 11, wherein the operations further comprise:
- determining a first zero-point attribute associated with the first chart; and
- updating a second zero-point attribute associated with the second chart to a same value at the first zero-point attribute.

\* \* \* \* \*